United States Patent
Temple et al.

(10) Patent No.: US 6,739,551 B2
(45) Date of Patent: May 25, 2004

(54) ENTRANCE DETERRENT FOR AIRPLANE FLIGHT CREW COMPARTMENT

(76) Inventors: Charles Temple, 179 LBI Blvd., Love Ladies, NJ (US) 08008; Walter Temple, 226 Oostanali Way, Loudon, TN (US) 37774

(*) Notice: Subject to any disclaimer, the term of this patent is extended or adjusted under 35 U.S.C. 154(b) by 0 days.

(21) Appl. No.: 10/253,685

(22) Filed: Sep. 24, 2002

(65) Prior Publication Data
US 2003/0075644 A1 Apr. 24, 2003

Related U.S. Application Data
(60) Provisional application No. 60/326,840, filed on Oct. 3, 2001.

(51) Int. Cl.[7] ............................................... B64D 11/00
(52) U.S. Cl. ............................. 244/118.5; 52/67; 109/3
(58) Field of Search ..................... 244/118.5; 52/67; 109/3, 6, 11, 14, 17

(56) References Cited

U.S. PATENT DOCUMENTS

| | | | | | |
|---|---|---|---|---|---|
| 3,534,512 A | * | 10/1970 | Ballas | ............................. | 52/67 |
| 3,629,982 A | * | 12/1971 | Ballay et al. | ................... | 52/69 |
| 3,704,845 A | * | 12/1972 | Ord | ............................. | 244/121 |
| 3,811,643 A | * | 5/1974 | Pizzo | ....................... | 244/137.2 |
| 3,854,409 A | * | 12/1974 | Blochlinger | ............ | 104/130.09 |
| 4,909,268 A | * | 3/1990 | Maggio | ....................... | 52/79.5 |
| 6,257,523 B1 | * | 7/2001 | Olliges | ..................... | 244/118.5 |
| 6,474,599 B1 | * | 11/2002 | Stomski | .................... | 244/118.5 |
| 6,588,705 B1 | * | 7/2003 | Frank | ....................... | 244/118.5 |
| 2002/0158166 A1 | * | 10/2002 | Lin | .......................... | 244/118.5 |
| 2003/0058112 A1 | * | 3/2003 | Gleine | ...................... | 340/573.1 |
| 2003/0127562 A1 | * | 7/2003 | Pereira et al. | ............ | 244/118.5 |

* cited by examiner

Primary Examiner—Michael J. Carone
Assistant Examiner—Daniel Matz
(74) Attorney, Agent, or Firm—Clifford G. Frayne

(57) ABSTRACT

An expandable/collapsible enclosure positioned about the existing door of a flight crew compartment of an airliner, which is expanded either manually or automatically by the motion of the aircraft to form an airlock type enclosure about the door to the flight crew compartment, the enclosure having its own outer secondary door controllable from the flight crew compartment, an individual seeking access to the flight crew compartment having to position themselves in front of the outer door and again within the enclosure for observation by the flight crew personnel before entering the flight crew compartment, the enclosure having chemical or gaseous means for immobilizing an individual not authorized to enter the enclosure or the flight crew compartment who may have overwhelmed a properly identified individual that was authorized to enter the enclosure.

13 Claims, 3 Drawing Sheets

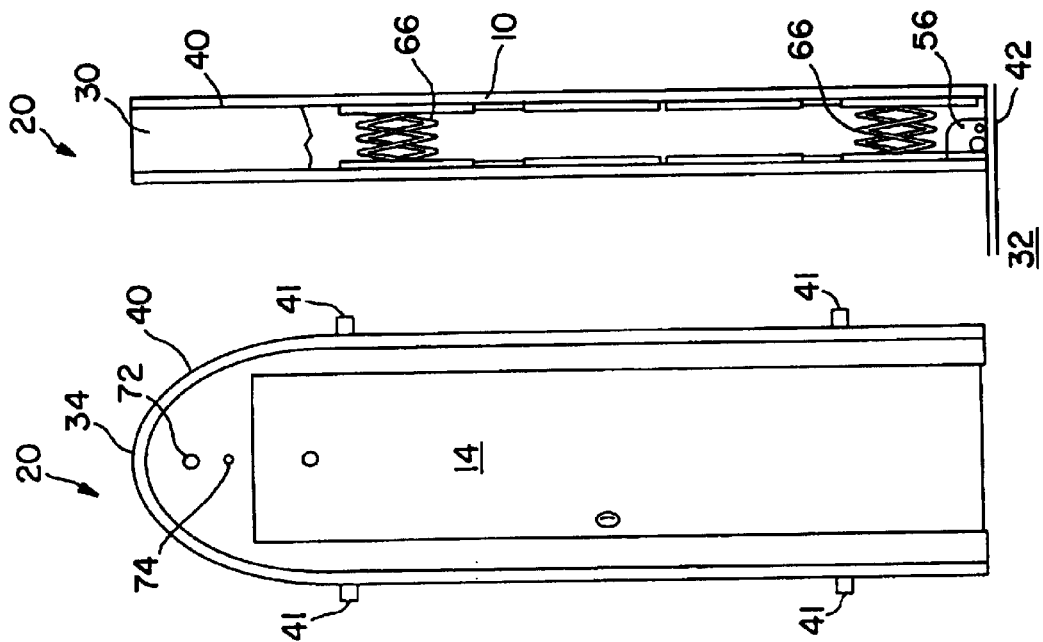
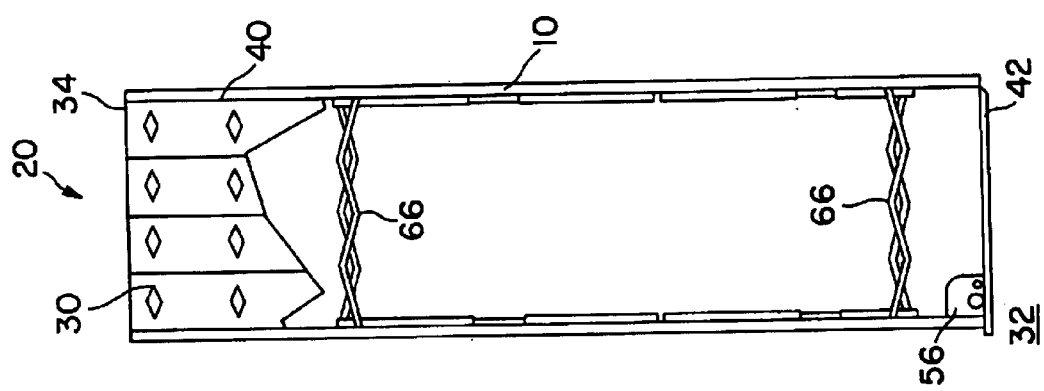
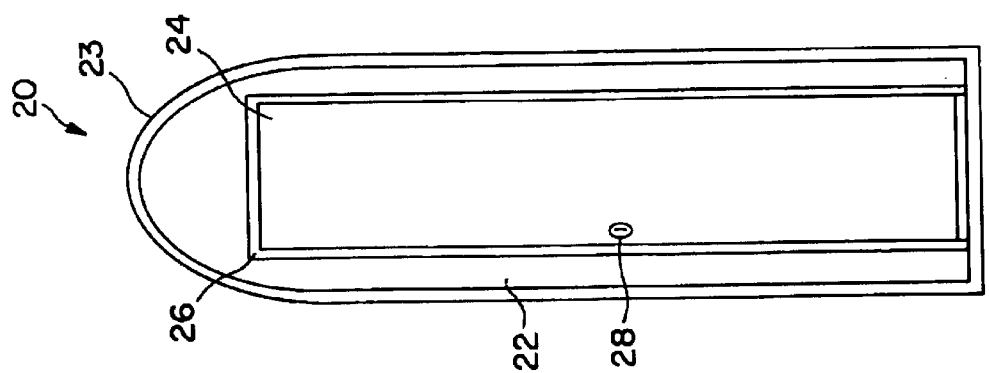
FIG. 2
FIG. 3
FIG. 4
FIG. 5

US 6,739,551 B2

ENTRANCE DETERRENT FOR AIRPLANE FLIGHT CREW COMPARTMENT

RELATED APPLICATIONS

Applicant claims the benefit of provisional application Serial No. 60/326,840, filed Oct. 3, 2001 and incorporates same herein.

BACKGROUND OF THE INVENTION

1. Field of the Invention

The present invention relates to a deterrent for preventing entrance of unauthorized personnel into the flight crew compartment or cockpit of an airplane.

2. Description of the Prior Art

Airplane hijackings are oftentimes accomplished by the hijacker being able to threaten passengers or flight attendants within the passenger compartment in order to coerce the flight crew personnel to fly the plane to the hijacker's destination. Recent events indicate that hijackers now may seek to commandeer the plane and actually take the flight controls for the hijacker's intended purpose by invading the flight crew compartment. It is therefore imperative that airliners be designed such that access to the flight crew area is denied to individuals having intent to harm the flight crew or commandeer the aircraft.

Various suggestions have been made regarding the strength and structural integrity of the flight crew compartment door, however, Applicant has devised an apparatus and means which would not only improve the denial of access to the flight crew compartment, but also provide for a means for isolation and immobilizing of any potential individual or hijacker seeking access to the flight crew compartment.

OBJECTS OF THE INVENTION

An object of the present invention is to provide for a novel deterrent to aircraft hijacking which would provide for a second flight crew compartment door and enclosure area wherein an unauthorized individual seeking to gain access to the flight crew compartment would be confined to an enclosed area and subject to immobilization by the flight crew personnel.

A further object of the present invention is to provide for a novel deterrent to aircraft hijacking which either is manually engaged or is automatically engaged by the motion of the aircraft.

A still further object of the present invention is to provide for a novel aircraft hijacking deterrent which is easily installed and does not interfere with the normal operation of an aircraft or the flight attendants.

SUMMARY OF THE INVENTION

An expandable/collapsible enclosure positioned about the existing door to a flight crew compartment of an airliner which is expanded either manually or automatically by the motion of the aircraft to form an airlock type enclosure about the door to the flight crew compartment, the enclosure having its own outer, secondary door controllable from the flight crew compartment, an individual seeking access to the flight crew compartment having to position themselves in front of the outer door and again within the enclosure for observation by the flight crew personnel before entering the flight crew compartment, the enclosure having chemical or gaseous means for immobilizing an individual not authorized to enter the enclosure or the flight crew compartment who may have overwhelmed the properly identified individual that was authorized to enter the enclosure.

BRIEF DESCRIPTION OF THE DRAWINGS

These and other objects of the present invention will become evident particularly when taken in light of the following illustrations wherein:

FIG. 2 is a forward looking view of the bulkhead of a commercial airliner as viewed from the passenger compartment with the deterrent enclosure deployed;

FIG. 3 is a side cross section view of the deterrent chamber of the present invention in a deployed or activated position;

FIG. 4 is a forward or front view of the bulkhead illustrating one manner of securing the inner end of the deterrent chamber to the bulkhead;

FIG. 5 is a side cross sectional view of the deterrent chamber in a collapsed or undeployed position;

DETAILED DESCRIPTION OF THE DRAWINGS

Figure 1:
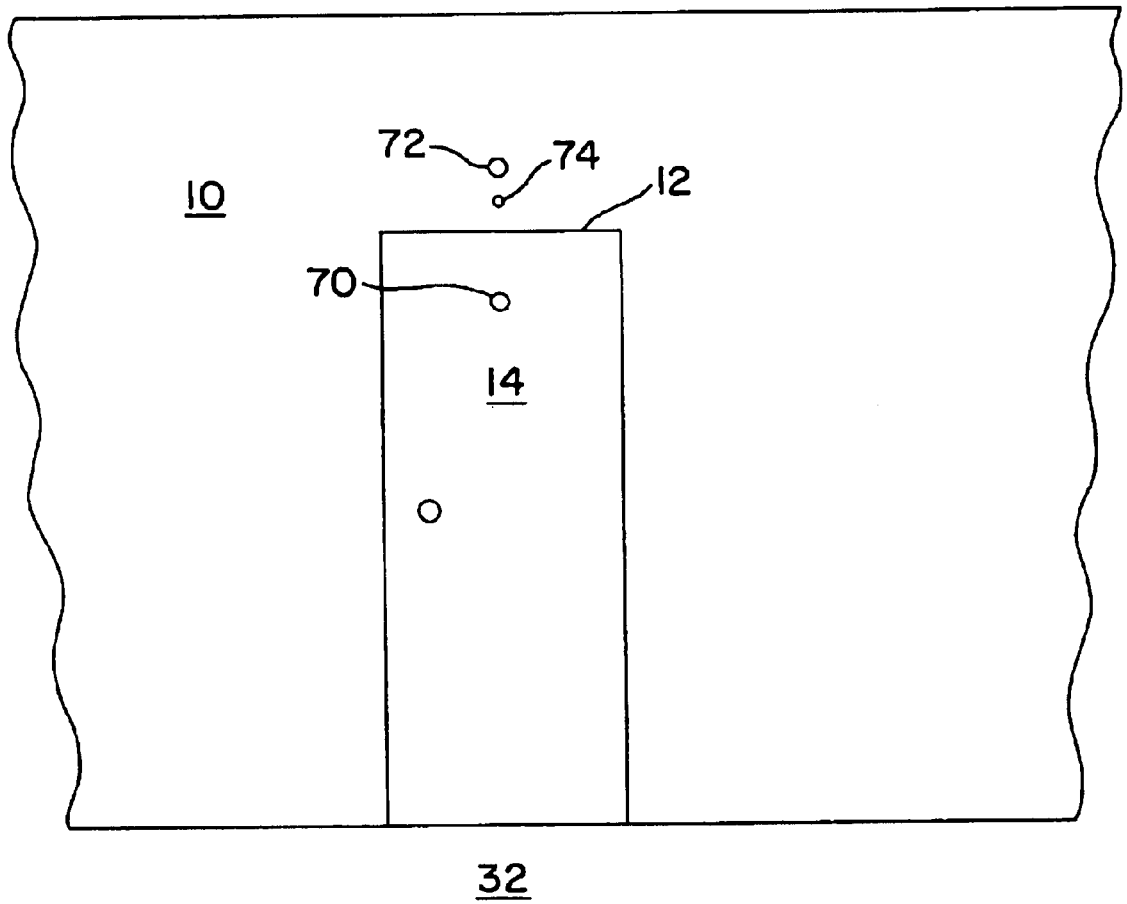
FIG. 1 is a forward looking view of the bulkhead of a commercial airliner as viewed from the passenger compartment.

FIG. 1 is a partial view of a typical flight crew compartment bulkhead viewed from the passenger compartment facing forward in the air craft. The bulkhead 10 defines the perimeter 12 of a typical, existing fixed access door 14 which allows entry and exit from the flight crew compartment to the passenger crew compartment by the flight crew members. The fixed access door 14 in the bulkhead 10 has been the subject of increased security measures on the flight crew compartment side of the door so as to strengthen the door and strengthen the security or locking mechanism within the flight crew compartment. Applicant's invention will provide additional security on the passenger compartment side of bulkhead 10.

FIG. 2 is a forward facing view of the flight crew compartment bulkhead 10 with Applicant's deterrent enclosure 20 positioned to the bulkhead. FIG. 3 is a side cutaway view of FIG. 2 illustrating the deterrent enclosure in a deployed or expanded state. FIG. 4 is illustrative of the manner in which the deterrent enclosure is secured to the bulkhead, and FIG. 5 is a partial cutaway side view of the deterrent enclosure in the undeployed or collapsed state.

The deterrent enclosure 20 is comprised of a generally rigid front wall 22, the periphery member 23 of front wall 22 is such that it extends beyond the periphery of fixed access door 14. This allows front wall 22 of deterrent enclosure 20 to have positioned therein a second door 24 whose periphery 26 is greater than that of fixed access door 14 to allow access to the flight crew compartment when deterrent enclosure 20 is in the collapsed or undeployed state. Second door 24 is equipped with a locking means 28 as more fully described hereafter. Periphery member 23 of front wall 22 is a rigid member which serves to partially support front wall 22, second door 24 and the side walls 30 of deterrent enclosure 20.

Figure 6:
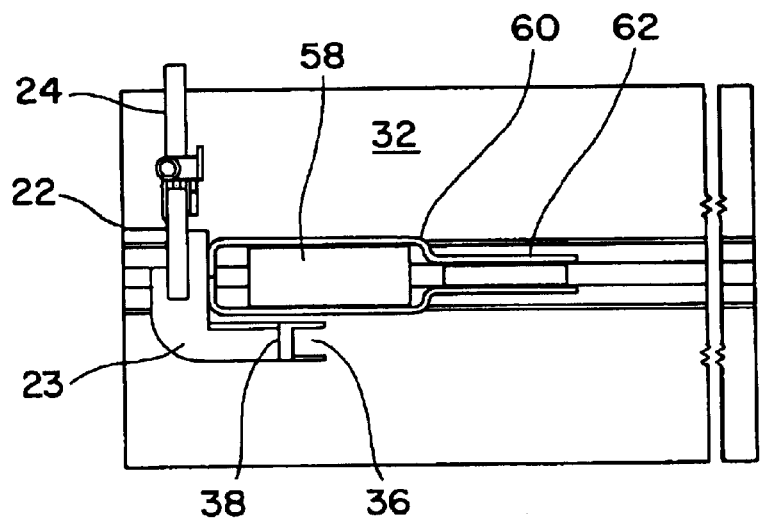
FIG. 6 is a top partial view of the floor transport system for the deterrent chamber.
Figure 7:
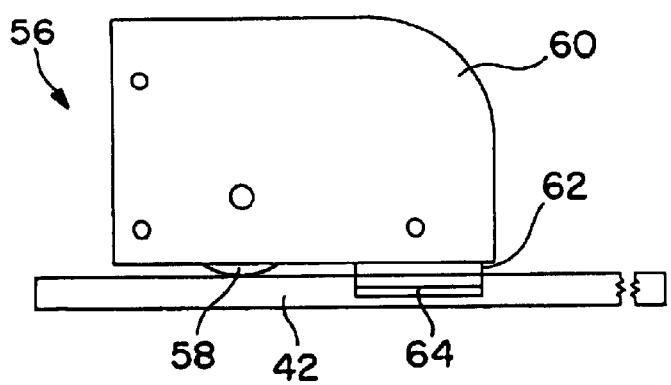
FIG. 7 is a side partial view of the transport system.
Figure 8:
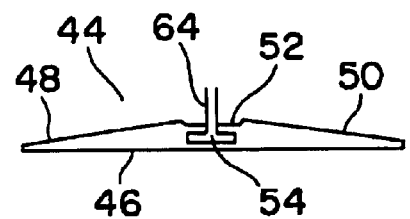
FIG. 8 is an end cross section view of the transport system rail.

The side wall 30 of the deterrent enclosure 20 is continuous in nature from the cabin deck 32 over the arched top 34 and down the opposing side to the cabin deck 32. The side wall is fabricated of a flexible, light weight, yet sturdy material, such as kevlar or the like, and is fabricated in an accordion-like manner such that it collapses upon itself when the deterrent enclosure 20 is not deployed and extends itself when the deterrent enclosure 20 is deployed. The side wall material is affixed to the rear of the front wall in a continuous nature in a groove 36 formed on the rear surface 38 of periphery frame member 23 of the front wall 22 (See FIG. 6). The other edge of the side wall 30 is fixedly secured to a similar U-shaped bulkhead frame member 40 having a securing channel and affixed to the bulkhead 10 about the fixed access door 14. Bulkhead frame member 40 is secured to bulkhead 10 by angle members 41 (See FIG. 4) or bulkhead frame member 40 may be an extruded angle shape. Both periphery frame member 23 and bulkhead frame member 40 would most likely be fabricated of extruded aluminum.

The material used to fabricate the side wall 30 of the deterrent enclosure 20 is of such a character that it is not easily cut or penetrated. As discussed hereafter, it may only be necessary to thwart a potential situation for a few seconds until other features of the deterrent enclosure 20 can be employed as discussed hereafter.

The deterrent enclosure 20 transitions from the undeployed stage to the deployed stage by means of a pair of tracks 42 and 44 positioned in the cabin deck 32 of the airliner on opposing sides of the affixed access door 14. The rails 42 and 44 are beveled on their edges so as to minimize any tripping situation when the deterrent enclosure is undeployed. In cross section, the rails 42 and 44 resemble a truncated triangle. The bottom surface 46 is flush with the cabin deck 32, the side walls 48 and 50 angle upwardly to proximate the midpoint, wherein they level out to form an elongated channel 52 for the length of the rails 42 and 44, this elongated channel having an elongated inverted T-shaped channel 54 depending downwardly therefrom which guides T-bar 64.

A transporter 56 would be associated with each of the rails 42 and 44. The transporter 56 comprises a roller means 58 rotatably mounted on a yoke 60, the roller means 58 designed to ride in elongated channel 52. The yoke 60 has a tail member 62 having a depending guide member 64 secured thereto, the guide member 64 in the shape of an inverted T in cross section and designed to ride in the inverted T-shaped channel 54 formed in the rails 42 and 44. The yoke is secured to the peripheral member 23 of the front wall 22.

In the illustrations shown herewith, the deterrent enclosure 20 is illustrated in the deployed state and in the undeployed state by means of a plurality of pantograph mechanisms 66. It will be recognized by those of ordinary skill in the art that the expansion or deployment and the collapse or undeployment of the deterrent enclosure can be effected by other means without parting from the spirit and scope of the invention.

The deterrent enclosure 20 can be deployed either manually by the flight crew in the flight crew compartment, or automatically upon the occurrence of a particular mechanical feature of the air craft. This automatic deployment could be initiated, for example, by the extension of the front landing gear once the nose lifts off the ground and the weight on that unit is relieved. Still further, the deployment of the deterrent enclosure 20 either manually or automatically may be accomplished by either mechanical, pneumatic, hydraulic, electronic or magnetic means well known in the art.

When the aircraft is on the ground and being serviced, the deterrent enclosure 20 is in the collapsed or undeployed state as illustrated in FIG. 5. The access to the flight crew compartment involves opening second door 24 to gain contact with the fixed access door 14. In this environment, the locking means associated with second door 24 would not be activated, such that the flight crew could pass back and forth between the flight crew compartment and the passenger compartment.

At take off, either manually or automatically, the deterrent enclosure would be deployed as heretofore described and illustrated. When in its expanded or deployed state, the opening of second door 24 would be controlled from within the flight crew compartment, the fixed access door to the flight crew compartment being secured from the flight crew compartment side. Once a recognized, authorized individual has been allowed access to the interior of the deterrent enclosure 20, the individual must close door 24, verifiable by the flight crew, and cannot exit the deterrent enclosure 20 via second door 24 without a release of the locking means from within the flight crew compartment. There would be associated with deterrent enclosure 20 a means for allowing the flight crew personnel to view the individual within the deterrent enclosure, such as a peep hole 70 in fixed access door 14 or a camera means 72 in bulkhead 10. If the individual was recognizable to the flight crew in the flight crew compartment as being an authorized individual, access through fixed access door 14 to the flight crew compartment could be granted and similarly exit through deterrent enclosure 20 and second door 24 could be granted.

If the individual viewed within the deterrent enclosure 20 posed a threat to the aircraft or the flight crew, access to the flight crew compartment and access out of the deterrent enclosure through second door 24 could be denied and a means for introduction 74 into deterrent enclosure 20 of a disabling gas or chemical could be initiated.

Applicant's deterrent enclosure deployed on the passenger compartment side of the bulkhead separating the flight crew compartment from the passenger compartment functions somewhat as an air lock. When in the deployed state, an individual wishing to go in either direction must position themselves within the deterrent enclosure 20, and be identified by the flight crew in the flight crew compartment. Only then can either the fixed access 14 or second door 24 be activated to permit egress from deterrent enclosure 20.

Applicant's design provides that the deterrent enclosure 20 when substantially collapsed against bulkhead 10 does not interfere with the ingress and egress of passengers onto the aircraft in the loading and unloading stages. In its deployed state it is designed not to interfere with the activities of individuals authorized to enter the flight crew compartment.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

We claim:

1. An entrance deterrent for the flight crew compartment of an airliner for establishing a deterrent enclosure adjacent said flight crew compartment door, said deterrent enclosure comprising:

a bulkhead separating a flight crew compartment from a passenger compartment, said bulkhead having a fixed door for entrance and exit said flight crew compartment;

a unitary, accordion fold side wall and ceiling having a first end secured to said bulkhead about said fixed door, and a second end secured to a periphery of a front wall, said front wall having a door and security means formed therein;

an extension means secured to said bulkhead and said front wall, said extension means deploying said unitary side wall and ceiling from a collapsed orientation proximate said bulkhead to an extended orientation and from said extended orientation to said collapsed orientation;

a guide means for guiding said front wall and said unitary side wall and ceiling from said collapsed orientation to said extended orientation and from said extended orientation to said collapsed orientation, said guide means comprising a pair of parallel rails secured to the deck and extending perpendicular from said bulkhead and disposed on both sides of said fixed door, said rails having a plurality of channels formed on an upper surface; and a transport means for deploying said front wall and said unitary side wall and ceiling from said collapsed orientation to said extended orientation and from said extended orientation to said collapsed orientation; said transport means comprising a yoke member having a roller means rotatably disposed therein, said yoke member secured to said front wall, said roller means aligned and guided within one of said plurality of channels in said parallel rails, said yoke means further having a depending arm slidably engageable within one of said plurality of channels of said rails.

2. The deterrent enclosure in accordance with claim 1 wherein said deterrent enclosure is deployed manually.

3. The deterrent enclosure in accordance with claim 1 wherein said deterrent enclosure is deployed automatically.

4. The deterrent enclosure in accordance with claim 1 wherein said unitary, accordion fold side wall and ceiling is fabricated of flexible impervious material.

5. The deterrent enclosure in accordance with claim 1 wherein said security means on said door on said front wall is controlled from said flight crew compartment.

6. The deterrent enclosure in accordance with claim 1 wherein said extension means of said deterrent enclosure is deployed mechanically.

7. The deterrent enclosure in accordance with claim 1 wherein said extension means of said deterrent enclosure is deployed pneumatically.

8. The deterrent enclosure in accordance with claim 1 wherein said extension means of said deterrent enclosure is deployed hydraulically.

9. The deterrent enclosure in accordance with claim 1 wherein said extension means of said deterrent enclosure is deployed electronically.

10. The deterrent enclosure in accordance with claim 1 wherein said extension means of said deterrent enclosure is deployed magnetically.

11. A method of deterring unauthorized individuals from entry into the flight crew compartment of an airliner by establishing a deterrent enclosure, the method comprising:

establishing a bulkhead separating a flight crew compartment from a passenger compartment, said bulkhead having a fixed door for entrance and exit to said flight crew compartment, said fixed door secured from said flight crew compartment side of said bulkhead;

affixing a first end of a unitary, accordion fold side wall and ceiling to said bulkhead about said fixed door;

affixing a front wall and secondary door to a second end of said unitary, accordion fold side wall and ceiling, said secondary door having a security means formed therein;

positioning an extension means between said bulkhead and said front wall, said extension means deploying said unitary side wall and ceiling from a collapsed orientation proximate said bulkhead to an extended orientation and from said extended orientation to said collapsed orientation;

positioning a guide means for guiding said front wall and said unitary side wall and ceiling from said collapsed orientation to said extended orientation and from said extended orientation to said collapsed orientation;

attaching a transport means for deploying said front wall and said unitary side wall and ceiling from said collapsed orientation to said extended orientation and from said extended orientation to said collapsed orientation;

extending said deterrent enclosure upon operation of said airliner;

controlling entry and exit into said deterrent enclosure from said passenger compartment by identification means and by controlling security means in said secondary door from said flight crew compartment;

viewing occupant of said deterrent enclosure from said flight crew compartment;

disabling an unauthorized occupant by chemical means initiated from said flight crew compartment.

12. The method of deterring unauthorized individuals from entering into the flight crew compartment of an airliner in accordance with claim 11 wherein said guide means comprises a pair of parallel rails secured to the deck of the aircraft and extending perpendicular from said bulkhead and disposed on both sides of said fixed door, said rails having a plurality of channels formed on an upper surface.

13. The method of deterring unauthorized individuals from entering into a flight crew compartment of an airliner in accordance with claim 11 wherein said transport means comprises a yoke member having a roller means rotatably disposed therein, said yoke member secured to said front wall and said roller means aligned and guided within one of said plurality of channels in said parallel rails, said yoke means secured to said parallel rails by a depending arm slidably engageable within one of said plurality of channels of said rails.

* * * * *